No. 861,825. PATENTED JULY 30, 1907.
I. FOX.
SPRING BRIDGE FOR EYEGLASSES.
APPLICATION FILED APR. 19, 1907.
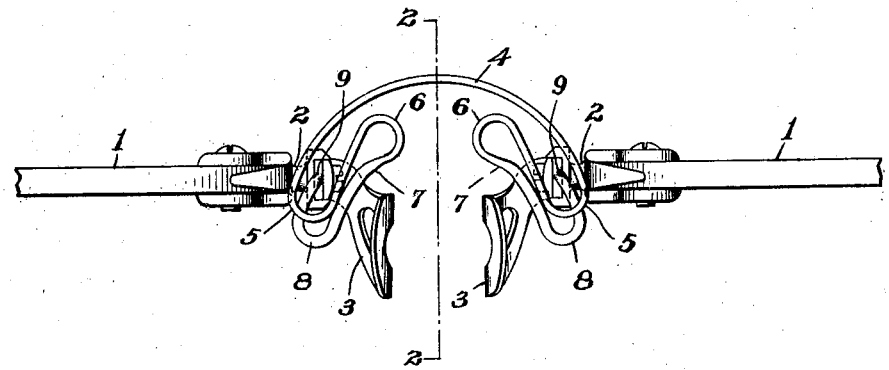
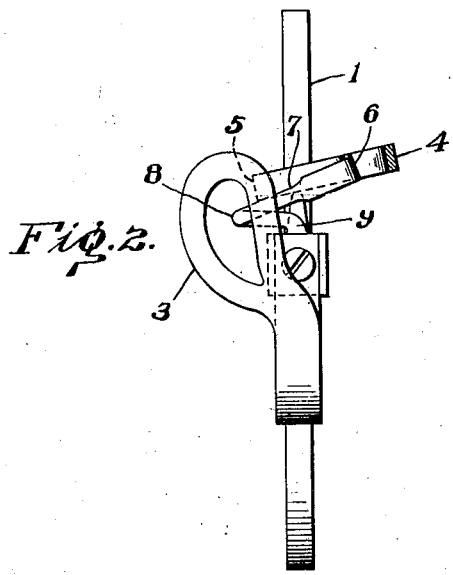
Witnesses
Dan'l Webster, Jr.
Cyrus N. Anderson
Inventor
Ivan Fox
By Wm. C. Strawbridge
Attorney

UNITED STATES PATENT OFFICE.

IVAN FOX, OF MEDIA, PENNSYLVANIA.

SPRING-BRIDGE FOR EYEGLASSES.

No. 861,825.  Specification of Letters Patent.  Patented July 30, 1907.

Application filed April 19, 1907. Serial No. 369,156.

*To all whom it may concern:*

Be it known that I, IVAN FOX, a citizen of the United States, residing at Media, in the county of Delaware, State of Pennsylvania, have invented certain new and useful Improvements in Spring-Bridges for Eyeglasses, of which the following is a specification.

My invention relates to an improvement in spring bridges for eye glasses, and it has for its object to provide a bridge with a plurality of bends between the main portion of the bridge and the point of connection of the same with the lenses, the said bends being located rearwardly of the central body portion of the bridge.

My invention is illustrated as applied to bridges of the class which are located below the top edges of the lenses and which occupy a plane extending transversely of the plane of the lenses.

By providing the plurality of bends or loops as illustrated, certain advantages and benefits are derived which will be fully pointed out in the detailed description which follows.

In order that my invention may be more readily understood, reference is to be had to the accompanying drawings, in which Figure 1 is a top plan view of a pair of glasses provided with my invention, portions of the glasses or lenses being broken away; and Figure 2 is a section on the line 2—2 of Figure 1.

In the drawings,—1 designates the lenses of a pair of eye glasses; 2 designates posts or standards which are secured or connected to the said lenses; 3 designates nose pieces which are secured to the posts or standards, the said nose pieces having the construction described and claimed in Patent No. 695,681, but it is to be understood that, if desired, nose pieces of any other construction than that shown may be employed.

4 designates a bridge for eye-glasses composed of a strip of suitable material and which is connected at its opposite ends to the posts or standards attached to the lenses. The posts or standards which are shown are of known construction, but it is to be understood that any other form of construction of posts or standards or any other means of connecting the ends of the spring bridge to the lenses of a pair of eye-glasses may be substituted for the particular construction of post or standard shown.

5 designates bends located at the outer ends of the body portion of the bridge 4, which bends are formed by bending the material of the bridge forwardly and inwardly toward the center or middle line of the bridge.

6 designates additional or second reverse bends located inwardly and forwardly of the bends 5, the said bends 6 being formed by bending the material of the bridge rearwardly and outwardly.

The material of the spring constituting the sides 7 of the bends 6 extends transversely of the plane of the lenses and outwardly toward the outer ends of the central or body portion of the bridge 4. These extended sides 7 are provided with bends 8 which are formed by bending the material of the bridge outwardly and forwardly. The forwardly extending sides of the bends 8 extend transversely of the plane of the lenses and are bent downwardly, as indicated at 9, so as to form a convenient means for connecting the bridge to the posts or standards, or such other means as may be provided for connecting the ends of the bridge to the lenses.

By bending and extending the strip forming the bridge in the manner set forth, the bends 5, 6 and 8 are located rearwardly of the central body portion of the bridge 4; that is, between such portion and the face of a person wearing the glasses. The said bends are illustrated as being located inside the ends of the central body portion of the bridge, that is, between such ends and the center or middle point of the bridge, but there may be changes in the relative positions of these parts without departing from my invention.

The bends 8, as will be noted from an inspection of the drawings, are located out of the plane of and slightly below the bend 5. The purpose of so locating the bends 8 is to facilitate the adjustment of the outwardly and forwardly extending portions of the bends 8 and thus facilitate the adjustment of the lenses which may be connected to the opposite ends of the bridge.

It will be noted that the bends 5 and 6 and 6 and 8 are located considerable distances from each other. One purpose of this is to increase the elasticity of the spring bridge. Another purpose is to provide means whereby the extent of adjustability of the portion of the bridge included in the bends or loops may be increased.

As previously indicated, the sides 7 of the reverse bends 6 are located rearwardly of the central body portion of the bridge and are adapted to rest against the nose of a person wearing eye glasses provided with my improved bridge. These sides 7 are adapted to be adjusted rearwardly and forwardly by opening or closing the loops 5 and 6. The advantage of these portions 7 resting upon the nose is that they support the weight of the glasses and leave the nose pieces to act as anchorages so that the glasses are held much more securely in position upon the nose than they otherwise would be.

By providing the bends 8 and the extension therefrom to the post or standard, as indicated in the drawings, I am enabled to adjust the optical centers of the lenses in relation to the eyes, with great facility without affecting the remaining portions of the bridge. The provision of the bends 8, therefore, not only adds to the resiliency of the spring but facilitates the adjustment of the lenses in relation to the eyes of a person on whom the glasses are being fitted.

When it is desired to place the glasses upon the nose, the nose pieces 3 are separated by bending the opposite ends of the bridge outwardly; that is to say, the curve of the central portion of the bridge 4 is widened or straightened. When this is done there is a tendency to close the bends 6 and 8, while the tendency is to open bend 5. By reason of this particular construction, a heightened or increased spring effect is produced.

Having thus described my invention, I claim:—

1. In eye glasses, in combination, the lenses, nose pieces connected to the said lenses, a bridge also connected to the said lenses, the said bridge being provided with bends at its opposite ends, the said bends being located rearwardly of the main portion of the bridge, and a portion of the said bridge constituting the side of one of the said bends at each end of the bridge being adapted to rest against the nose of a person wearing the glasses.

2. In eye glasses, in combination, the lenses, nose pieces connected to the said lenses, an elastic spring bridge also connected to the said lenses, the said bridge being provided with bends which are located rearwardly of the main portion thereof, the said bends being in planes extending transversely to the plane of the said lenses, and a portion of the bridge constituting the side of one of the bends at each end of the said bridge being adapted to rest against the nose of a person wearing the said glasses.

3. As an article of manufacture, a bridge for eye glasses consisting of a strip of suitable material provided with bends at its opposite ends which extend forwardly and inwardly, additional reverse bends in the portions of said strip beyond the first-named bends, which additional bends extend rearwardly and outwardly, and bends in the portions of the said strip beyond the said additional bends, the said third-mentioned bends extending outwardly and forwardly, the forwardly extending portions of the said third-mentioned bends extending transversely of the lenses of a pair of glasses to which the said bridge may be connected.

4. As an article of manufacture, a bridge for eye glasses consisting of a strip of suitable material provided with forwardly and inwardly extending bends at its opposite ends, reverse bends, in the portions of the said strip beyond the said first-mentioned bends, which extend rearwardly and outwardly, bends in the strip beyond the second-named bends, the said third-mentioned bends extending outwardly and forwardly and being located adjacent to and out of the plane of the first-named bends, substantially as described.

5. In eye glasses, in combination, the lenses, a bridge for operatively connecting the said lenses, the said bridge consisting of a strip of suitable material provided with bends at its opposite ends which extend forwardly and inwardly, additional reverse bends in the portions of said strip beyond the first-named bends, which additional bends extend rearwardly and outwardly, and bends in the portions of said strip beyond the said additional bends, the said third-mentioned bends extending outwardly and forwardly, and the last mentioned forwardly extending portions of said strip extending transversely of the lenses of the eyeglasses and being adapted to be connected to the said lenses.

In testimony that I claim the foregoing as my invention, I have hereunto signed my name this 18 day of April, A. D. 1907.

IVAN FOX.

In the presence of—
S. HORACE MYERS.
LAURA KLEINFELDER.